UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

1,037,410.  Specification of Letters Patent.  Patented Sept. 3, 1912.

No Drawing.  Application filed September 20, 1910.  Serial No. 582,917.

*To all whom it may concern:*

Be it known that I, OSCAR BALLY, Ph. D., chemist, a citizen of the Swiss Republic, residing at Mannheim, Germany, have invented new and useful Improvements in Anthracene Dye and Processes of Making Same, of which the following is a specification.

This invention relates to the production of coloring matters of the anthracene series. I have discovered that halogenated diphenyl-methane compounds of a constitution corresponding to the general formula

Hl—R—CX$_2$—R—Hl (in which R represents a benzene nucleus, either substituted or not, and X represents a neutral substituent containing hydrogen, under which term I include either hydrogen, or alkyl or aryl, or aralkyl) can be condensed with amino-anthraquinone bodies and that the products of such condensation contain at least one anthraquinone residue attached to a diphenyl-methane residue by means of an amino group, and can be employed in the unsulfonated form as vat coloring matters, or in the sulfonated form they can be used for dyeing wool.

The following is an example of how my invention can be carried into practical effect, but the invention is not confined to this example. The parts are by weight. Boil together, in a reflux apparatus, fifty parts of 4.4'-dichlor-diphenyl-methane, one hundred parts of 1-amino-anthraquinone, twenty parts of calcined soda, two parts of copper oxid and fifteen hundred parts of nitrobenzene. When the reaction is finished, allow the mass to cool, filter off the reaction product, wash the mass with alcohol, and dry it. It is then a reddish brown powder which is fairly easily soluble in hot nitrobenzene the solution being red, and it is soluble in concentrated sulfuric acid, the solution being of an olive color, and it is also soluble in fuming sulfuric acid of twenty-three per cent. free SO$_3$ the solution being green. It dyes cotton from the vat, yielding Bordeaux-red shades of great fastness. On treating it with fuming sulfuric acid at 30° C., until a test portion gives a clear solution in water, it is converted into a sulfonic acid which dyes wool brilliant red shades. The product possesses a constitution corresponding to the formula

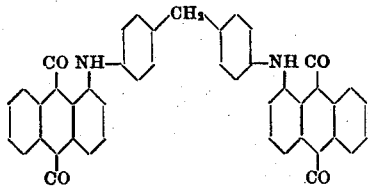

In a similar manner, other halogenated diphenyl-methane compounds can be employed, and, instead of 1-amino-anthraquinone, other amino compounds of anthraquinone, or derivatives thereof, can be used. Instead of copper oxid, other suitable condensation agent, such for instance as cuprous chlorid, can be used.

Now what I claim is:—

1. The process of producing coloring matters of the anthracene series by treating a halogenated diphenyl-methane compound of a constitution corresponding to the formula

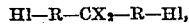
Hl—R—CX$_2$—R—Hl, where R represents a benzene nucleus and X represents a neutral substituent containing hydrogen, with an amino compound of the anthraquinone series.

2. The process for producing coloring matter of the anthracene series by condensing 4.4'-dichlor-diphenyl-methane with 1-amino-anthraquinone.

3. As new articles of manufacture the coloring matters of the anthracene series which probably possess a constitution corresponding to the formula

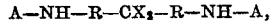
A—NH—R—CX$_2$—R—NH—A, where A is an anthraquinone nucleus, R is a benzene nucleus and X is a neutral substituent containing hydrogen, which coloring matters can be employed in the unsulfonated form as vat coloring matters and in the sulfonated form can be used for dyeing wool.

4. As a new article of manufacture the coloring matter which probably possesses a constitution corresponding to the formula

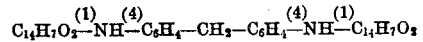
C$_{14}$H$_7$O$_2$—$\overset{(1)}{N}$H—C$_6$H$_4$$\overset{(4)}{}$—CH$_2$—C$_6$H$_4$$\overset{(4)}{}$—$\overset{(1)}{N}$H—C$_{14}$H$_7$O$_2$ which coloring matter consists when dry of a reddish brown powder which yields a red solution in hot nitrobenzene, an olive solution in concentrated sulfuric acid, and a green solution in fuming sulfuric acid of twenty-three per cent. free $SO_3$, and which
5 when unsulfonated dyes cotton from the vat Bordeaux red, while in the sulfonated form it dyes wool brilliant red shades.

In testimony whereof I have hereunto set my hand in the presence of two subscribing witnesses.

OSCAR BALLY.

Witnesses:
T. ALEC. LLOYD,
JOSEF PFEIFFER.